US007558581B2

(12) United States Patent
Hasegawa

(10) Patent No.: US 7,558,581 B2
(45) Date of Patent: Jul. 7, 2009

(54) APPARATUS AND METHOD FOR RESETTING PHYSICAL CHANNEL

(75) Inventor: Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 519 days.

(21) Appl. No.: 11/391,222

(22) Filed: Mar. 29, 2006

(65) Prior Publication Data

US 2007/0147370 A1 Jun. 28, 2007

(30) Foreign Application Priority Data

Dec. 26, 2005 (JP) ............................ 2005-371646

(51) Int. Cl.
*H04W 72/00* (2009.01)

(52) U.S. Cl. ...................... 455/452.1; 455/522; 455/69; 455/450; 455/436; 455/509; 307/331; 307/318; 307/335; 307/342; 307/390

(58) Field of Classification Search ................. 455/436, 455/512, 509, 450–452.2, 522, 69; 370/331
See application file for complete search history.

(56) References Cited

U.S. PATENT DOCUMENTS

| | | | | |
|---|---|---|---|---|
| 5,673,259 | A * | 9/1997 | Quick, Jr. | 370/342 |
| 5,946,620 | A | 8/1999 | Schultz et al. | |
| 6,347,091 | B1 * | 2/2002 | Wallentin et al. | 370/437 |
| 6,418,148 | B1 * | 7/2002 | Kumar et al. | 370/468 |
| 6,434,130 | B1 * | 8/2002 | Soininen et al. | 370/331 |
| 6,539,234 | B1 * | 3/2003 | Hiramatsu et al. | 455/522 |
| 6,594,238 | B1 * | 7/2003 | Wallentin et al. | 370/252 |
| 6,754,493 | B1 * | 6/2004 | Jetzek | 455/436 |
| 6,993,342 | B2 * | 1/2006 | Kuchibhotla et al. | 455/450 |
| 7,013,143 | B2 * | 3/2006 | Love et al. | 455/450 |
| 7,050,803 | B2 * | 5/2006 | Celedon et al. | 455/436 |
| 7,283,508 | B2 * | 10/2007 | Choi et al. | 370/341 |
| 7,289,470 | B2 * | 10/2007 | Shimazaki | 370/331 |
| 7,304,970 | B1 * | 12/2007 | Ishikawa | 370/335 |
| 7,346,034 | B2 * | 3/2008 | Takano et al. | 370/331 |
| 7,379,863 | B2 * | 5/2008 | Delfs et al. | 704/201 |
| 7,403,745 | B2 * | 7/2008 | Dominique et al. | 455/67.11 |
| 7,408,901 | B1 * | 8/2008 | Narayanabhatla | 370/331 |
| 2002/0068618 | A1 | 6/2002 | Shoobridge | |
| 2004/0005898 | A1 * | 1/2004 | Kato et al. | 455/450 |
| 2004/0127221 | A1 | 7/2004 | Takano et al. | |
| 2005/0143116 | A1 * | 6/2005 | Hsu et al. | 455/522 |

FOREIGN PATENT DOCUMENTS

EP 1 343 343 A1 9/2003

(Continued)

*Primary Examiner*—Sharad Rampuria
(74) *Attorney, Agent, or Firm*—Hanify & King, P.C.

(57) ABSTRACT

A wireless communication system in which a communication apparatus performs a packet communication with a radio network controller through a base transceiver station stores identification information about a communication line in a first state in which communications are performed using an individual channel and line information including a setting parameter. When an index of an amount of data communication in the first state falls below a threshold, the individual channel is released and a transition to a second state in which communications are performed using a common channel is performed. When an index in the second state exceeds the threshold, recovery to the first state is performed using the setting parameter.

13 Claims, 20 Drawing Sheets

FOREIGN PATENT DOCUMENTS

| | | | |
|---|---|---|---|
| EP | 1 628 442 | A1 | 2/2006 |
| FR | 2 848 769 | A1 | 6/2004 |
| JP | A-2003-051855 | | 2/2003 |
| JP | A-2004-147050 | | 5/2004 |
| JP | A-2005-198082 | | 7/2005 |
| WO | WO 01/31950 | A1 | 5/2001 |

* cited by examiner

| IE/Group Name | Presence | Range | Semantics Description |
|---|---|---|---|
| Message Discriminator | M | | |
| Message Type | M | | |
| Transaction ID | M | | |
| CRNC Communication Context ID | M | | The reserved value "All CRNCCC" shall not be used. |
| UL DPCH Information | | 1 | |
| >UL Scrambling Code | M | | |
| >Min UL Channelisation Code Length | M | | |
| >Max Number of UL DPDCHs | C-CodeLen | | |
| >Puncture Limit | M | | For UL |
| >TFCS | M | | For UL |
| >UL DPCCH Slot Format | M | | |
| >UL SIR Target | M | | |
| >Diversity Mode | M | | |
| >SSDT Cell ID Length | O | | |
| >S Field Length | O | | |
| >DPC Mode | O | | |
| DL DPCH Information | | 1 | |
| >TFCS | M | | For DL |
| >DL DPCH Slot Format | M | | |
| >TFCI Signalling Mode | M | | |
| >TFCI Presence | C-SlotFormat | | |
| >Multiplexing Position | M | | |
| >PDSCH RL ID | C-DSCH | | |
| >PDSCH Code Mapping | C-DSCH | | |
| >Power Offset Information | | 1 | |
| >>PO1 | M | | Power offset for the TFCI bits |
| >>PO2 | M | | Power offset for the TPC bits |
| >>PO3 | M | | Power offset for the pilot bits |
| >FDD TPC DL Step Size | M | | |
| >Limited Power Increase | M | | |
| >Inner Loop DL PC Status | M | | |
| DCH Information | M | | |
| DSCH Information | O | | |
| TFCI2 Bearer Information | | 0..1 | |
| >ToAWS | M | | |
| >ToAWE | M | | |
| >Binding ID | O | | Shall be ignored if bearer establishment with ALCAP. |
| >Transport Layer Address | O | | Shall be ignored if bearer establishment with ALCAP. |

FIG. 2A

| | | | |
|---|---|---|---|
| RL Information | | 1..<maxnoofRLs> | |
| >RL ID | M | | |
| >C-ID | M | | |
| >First RLS Indicator | M | | |
| >Frame Offset | M | | |
| >Chip Offset | M | | |
| >Propagation Delay | O | | |
| >Diversity Control Field | C-NotFirstRL | | |
| >DL Code Information | M | | |
| >Initial DL Transmission Power | M | | Initial power on DPCH |
| >Maximum DL Power | M | | Maximum allowed power on DPCH |
| >Minimum DL Power | M | | Minimum allowed power on DPCH |
| >SSDT Cell Identity | O | | |
| >Transmit Diversity Indicator | C-Diversity mode | | |
| >SSDT Cell Identity For EDSCHPC | C-EDSCHPC | | |
| >RL Specific DCH Information | O | | |
| >Delayed Activation | O | | |
| >Qth Parameter | O | | |
| >Primary CPICH Usage For Channel Estimation | O | | |
| Transmission Gap Pattern Sequence Information | O | | |
| Active Pattern Sequence Information | O | | |
| DSCH Common Information | O | | |
| DL Power Balancing Information | O | | |
| HS-DSCH Information | O | | |
| HS-DSCH-RNTI | C-InfoHSDSCH | | |
| HS-PDSCH RL ID | C-InfoHSDSCH | | |

FIG. 2B

| Information Element/Group name | Need | Multi | Type and reference | Semantics description |
|---|---|---|---|---|
| Message Type | MP | | Message Type | |
| UE Information Elements | | | | |
| RRC transaction identifier | MP | | RRC transaction identifier 10.3.3.36 | |
| Integrity check info | CH | | Integrity check info 10.3.3.16 | |
| Integrity protection mode info | OP | | Integrity protection mode info 10.3.3.19 | The UTRAN should not include this IE unless it is performing an SRNS relocation |
| Ciphering mode info | OP | | Ciphering mode info 10.3.3.5 | The UTRAN should not include this IE unless it is performing an SRNS relocation and a change in ciphering algorithm |
| Activation time | MD | | Activation time 10.3.3.1 | Default value is "now" |
| New U-RNTI | OP | | U-RNTI 10.3.3.47 | |
| New C-RNTI | OP | | C-RNTI 10.3.3.8 | |
| New DSCH-RNTI | OP | | DSCH-RNTI 10.3.3.9a | |
| New H-RNTI | OP | | H-RNTI 10.3.3.14a | |
| RRC State Indicator | MP | | RRC State Indicator 10.3.3.10 | |
| UTRAN DRX cycle length coefficient | OP | | UTRAN DRX cycle length coefficient 10.3.3.49 | |

FIG. 3A

| | | | | |
|---|---|---|---|---|
| CN Information Elements | | | | |
| CN Information info | OP | | CN Information info 10.3.1.3 | |
| UTRAN mobility information elements | | | | |
| URA identity | OP | | URA identity 10.3.2.6 | |
| RB information elements | | | | |
| Downlink counter synchronisation info | OP | | | |
| >RB with PDCP information list | OP | 1 to <maxRBallRABs> | | |
| >>RB with PDCP information | MP | | RB with PDCP information 10.3.4.22 | This IE is needed for each RB having PDCP in the case of lossless SRNS relocation |
| | OP | | | |
| >>PDCP context relocation info | OP | | PDCP context relocation info 10.3.4.1a | This IE is needed for each RB having PDCP and performing PDCP context relocation |
| TrCH Information Elements | | | | |
| Uplink transport channels | | | | |
| UL Transport channel information common for all transport channels | OP | | UL Transport channel information common for all transport channels 10.3.5.24 | |

FIG. 3B

| | | | | |
|---|---|---|---|---|
| Added or Reconfigured TrCH information list | OP | 1 to <maxTrCH> | | |
| >Added or Reconfigured UL TrCH information | MP | | Added or Reconfigured UL TrCH information 10.3.5.2 | |
| CHOICE mode | OP | | | |
| >FDD | | | | |
| >>CPCH set ID | OP | | CPCH set ID 10.3.5.3 | |
| >>Added or Reconfigured TrCH | | | | |
| information for DRAC list | OP | 1 to <maxTrCH> | | |
| >>>DRAC static information | MP | | DRAC static information 10.3.5.7 | |
| >TDD | | | | (no data) |
| Downlink transport channels | | | | |
| DL Transport channel information common for all transport channels | OP | | DL Transport channel information common for all transport channels 10.3.5.6 | |
| Added or Reconfigured TrCH information list | OP | 1 to <maxTrCH> | | |
| >Added or Reconfigured DL TrCH information | MP | | Added or Reconfigured DL TrCH information 10.3.5.1 | |

FIG. 3C

| | | | | |
|---|---|---|---|---|
| PhyCH information elements | | | | |
| Frequency info | OP | | Frequency info 10.3.6.36 | |
| Uplink radio resources | | | | |
| Maximum allowed UL TX power | MD | | Maximum allowed UL TX power 10.3.6.39 | Default value is the existing maximum UL TX power |
| CHOICE channel requirement | OP | | | |
| >Uplink DPCH info | | | Uplink DPCH info 10.3.6.88 | |
| >CPCH SET Info | | | CPCH SET Info 10.3.6.13 | |
| Downlink radio resources | | | | |
| CHOICE mode | MP | | | |
| >FDD | | | | |
| >>Downlink PDSCH information | OP | | Downlink PDSCH information 10.3.6.30 | |
| >TDD | | | | (no data) |
| Downlink HS-PDSCH Information | OP | | Downlink HS-PDSCH Information 10.3.6.23a | |
| Downlink information common for all radio links | OP | | Downlink information common for all radio links 10.3.6.24 | |
| Downlink information per radio link list | OP | 1 to <maxRL> | | Send downlink information for each radio link |
| >Downlink information for each radio link | MP | | Downlink information for each radio link 10.3.6.27 | |

FIG. 3D

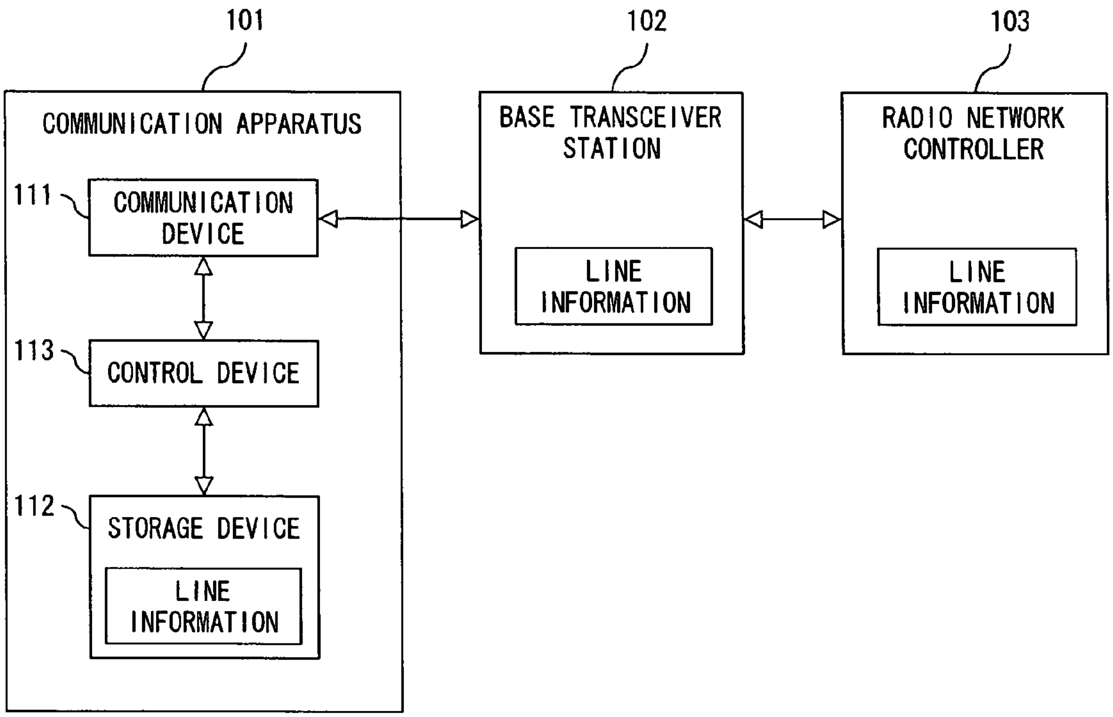
F I G. 4A

| ID | | PARAMETER |
|---|---|---|
| LINE NUMBER | MS ADDRESS | RRC PARAMETER |
| | BTS ADDRESS | NBAP PARAMETER |

FIG. 6

| ID | PARAMETER |
| --- | --- |
| LINE NUMBER | NBAP PARAMETER |

FIG. 7

| ID | PARAMETER |
|---|---|
| LINE NUMBER | RRC PARAMETER |

FIG. 8

| | IE/Group Name | Presence | Range | Semantics Description |
|---|---|---|---|---|
| | Message Discriminator | M | | |
| | Message Type | M | | |
| 901 | RESUME LINE ID INFORMATION | M | | RESUME REQUEST IDENTIFICATION |
| | > Transaction ID | M | | |
| | > CRNC Communication Context ID | M | | |
| | >RL Information | | | |
| | >>RL ID | M | | |
| | >>C-ID | M | | |
| | >>Chip Offset | M | | |
| | >>Propagation Delay | O | | |
| 902 | >>Initial DL Transmission Power | M | | Initial power on DPCH |
| | >HS-DSCH Information | O | | |
| | >HS-DSCH-RNTI | C-InfoHSDSCH | | |
| | >HS-PDSCH RL ID | C-InfoHSDSCH | | |

F I G. 9

| Information Element/ Group name | Need | Multi | Type and reference | Semantics description |
|---|---|---|---|---|
| Message Type | MP | | Message Type | |
| UE Information Elements | | | | |
| RESUME LINE ID INFORMATION | M | | RESUME REQUEST IDENTIFICATION | |
| >RL Information | | | | |
| >>RL ID | | | | |
| >>C-ID | | | | |

1001

F I G. 1 0

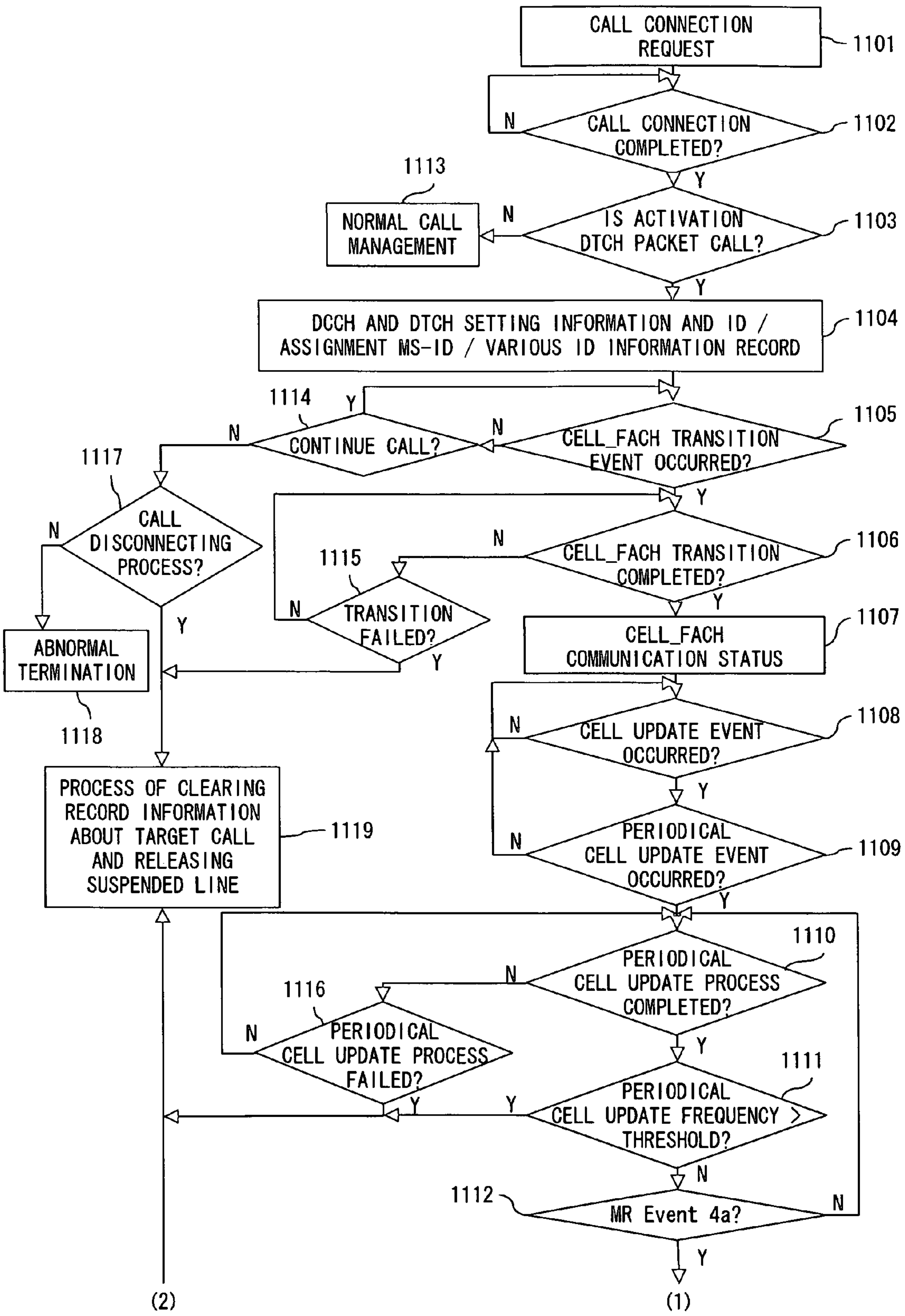
F I G. 1 1

APPARATUS AND METHOD FOR RESETTING PHYSICAL CHANNEL

BACKGROUND OF THE INVENTION

1. Field of the Invention

The present invention relates to an apparatus for resetting a physical channel in a wireless communication system, and more specifically to a method for resetting a physical channel performed when communication status is changed between a mobile station and a radio network controller in a mobile communication system having a technology of wideband code division multiple access (W-CDMA).

2. Description of the Related Art

Relating to a method of assigning a common communication channel in a UMTS (universal mobile telecommunications system), a message, an algorithm, etc. to be used in a 3GPP (3rd Generation Partnership Project) are recommended. Generally, an individual channel as a physical channel specific to each mobile station (MS) is activated by a trigger of a mobile station in an idle status transmitting a connection request, or calling an MS in an idle status from a network.

When the individual channel is activated, each of the mobile station, the base transceiver station (BTS), and the radio network controller (RNC) forming part of a wireless network determines various parameters according to various types of information such as a requested circuit class, line speed, etc. and activates the line.

Relating to a packet communication, a status of assigning an individual channel and performing a packet communication, and a status of using a common channel as a physical channel common among a plurality of MSs and performing a packet communication are defined. The former is referred to as a Cell_DCH (dedicated channel) status, and the latter is referred to as a Cell_FACH (forward access channel) status.

The MS and the RNC determine the communication status to be used mainly based on the line use rate. For example, the MS can use the Cell_DCH status when the line use rate is high (when there is a large amount of data communication). In this case, for example, an individual channel line of a fix rate of 384 kbps is continuously used.

On the other hand, when the line use rate is low (when there is a small amount of data communication), the MS temporarily releases an individual channel line, the status is changed to the Cell_FACH status, and the minimal data transmission/reception is performed in the common channel line (FACH: DL (downlink), RACH: UL (uplink)). When the line use rate in Cell_FACH increases (when the amount of data communication increases), the individual channel line is re-activated (reset) again.

As described above, when an individual channel is activated from the idle status and a transition is performed between an individual channel and a common channel, it is necessary to set various parameters relating to setting a channel of an Iub line between the RNC and the BTS and a Uu line between the MS and the BTS when an individual channel is set. At this time, the parameter of the Iub line is set using an NBAP signal (node B application part) as a control signal between the RNC and the BTS, and the parameter of the Uu line is set using an RRC (radio resource control) signal as a control signal between the RNC and the MS.

FIG. 1A shows the basic operation sequence of activating an individual channel when a call is issued in the idle status in the conventional UMTS system. The individual channel is constituted by a DCCH (dedicated control channel) and a DTCH (dedicated traffic channel).

First, the MS transmits a call connection request 11 to the RNC. In response to the request, the RNC communicates messages 12 through 15 with the BTS, and communicates messages 16 and 17 with the MS. Thus, the DCCH resource is activated.

Then, procedures 18 through 20 are performed with the MS, BTS and the RNC, and the CN (core network) not shown in the attached drawings.

Next, messages 21 through 25 are communicated among the MS, BTS, and RNC, and the DTCH resource is activated. After a procedure 26 is performed, the connection of the individual channel line is connected.

FIG. 1B shows the basic operation sequences of the transition from a Cell_DCH to a Cell_FACH and the recovery from the Cell_FACH to the Cell_DCH.

While the communication is being performed along the Cell_DCH, the MS and the RNC performs a procedure 31, and the line use rate is monitored. When a line use rate lower than a threshold is detected in an event 32, the MS transmits to the RNC a message 33 of a measurement report event **4*b*** requesting the transition to the Cell_FACH.

In response to the request, messages 34 through 38 are communicated between the MS and the RNC, and messages 39 through 44 are communicated between the BTS and the RNC. Thus, the individual channel line is released, and the system passes control to the Cell_FACH.

Next, when a line use rate exceeding the threshold is detected again in an event 45, the MS transmits to the RNC a message 46 of a measurement report event **4*a* requesting the reset of the individual channel line. In response to the request, messages 47 through 52 are communicated between the BTS and the RNC. At this time, the RNC transmits to the BTS the message 47** (radio link setup request) via the NBAP signal, and notifies the BTS of the values of various parameters required to additionally activate the DCCH and the DTCH.

Next, the RNC transmits to the MS a message 53 (transport channel reconfiguration) via an RRC signal, and notifies the MS of the values of various parameters required to activate the DTCH.

The MS performs a recovery operation 54 from the Cell_FACH to the Cell_DCH using a transmitted parameter, and transmits a message 55 to the RNC. Thus, the system recovers to the Cell_DCH. The messages 39 through 55 are communicated along the Cell_FACH.

FIGS. 2A and 2B show the contents of the message 47 prescribed by the 3GPP TS25.433. An IE/Group Name is a parameter name, and “Presence” indicates the types of M (mandatory), O (optional), and C (conditional).

FIGS. 3A through 3D show the contents (parameter) of the message 53 prescribed by the 3GPP TS25.331. Information Element/Group Name is a parameter name, and “Need” indicates the types of MP (mandatorily present), MD (mandatory with default value), OP (optional), and CH (conditional on history).

Aside from the Cell_FACH, the Cell_PCH (paging channel) and the URA (UTRAN registration area)_PCH are prescribed. At the recovery from these communication statuses to the Cell_DCH, a parameter is reset using a message among the MS, BTS, and RNC.

The following patent document 1 relates to a mobile communication system for setting the status of a mobile station by a base station notifying the mobile station of transmission/reception status update information.

The following patent document 2 relates to a communication system for performing data communication using the same logical line as in making the first connection according to the line connection related information about the logical line at the first connection.

The following patent document 3 relates to a mobile communication terminal for selecting the optimum communication system from among a plurality of communication systems according to the information corresponding to the target use specified by a user and setting corresponding communication software.

[Patent Document 1] Japanese Published Patent Application No. 2004-147050

[Patent Document 2] Japanese Published Patent Application No. 2003-051855

[Patent Document 3] Japanese Published Patent Application No. 2005-198082

In the conventional UMTS system, it is necessary for the RNC to notify the BTS and MS of all parameter required to activate the channel of the Cell_DCH for the recovery from the Cell_FACH to the Cell_DCH using a message. There are a large number of parameters as shown in FIGS. 2A through 3D. Therefore, when an individual channel is connected again, it takes a long time to set the parameters as well as to issue a call from the idle status.

Especially, when the MS performs a status change during the communication in a new mobile communication system in which IP-voice (VoIP) and IP-video are transmitted in real time, it is considered to be necessary to suppress the parameter setting time within, for example, several hundred milliseconds. Therefore, at the recovery from the Cell_FACH to the Cell_DCH, it is desired to minimize the number of parameters to be reset.

SUMMARY OF THE INVENTION

The present invention aims at shortening the time required to simplify a parameter setting operation and connect an individual channel again when the communication status is changed from an individual channel to a common channel and then returned to the original individual channel again in a wireless communication system provided with an individual channel and a common channel as physical channels The communication apparatus according to the present invention includes a communication device, a storage device, and a control device. The communication device performs a packet communication with a radio network controller through a base transceiver station using an individual channel or a common channel in a wireless communication system as a physical channel. The storage device stores the identification information about a communication line in a first state in which the packet communication is performed with the radio network controller using an individual channel, and the line information including a setting parameter of a communication line in the first state. The control device releases the individual channel with the line information about the communication line held when it compares the index of the amount of packet data communication in the first state with a predetermined threshold and the index falls below the threshold, and performs control of changing to a second state in which a packet communication is performed with the radio network controller using the common channel. When it compares the index of the amount of packet data communication in the second state with the threshold, and when the index exceeds the threshold, it performs control of recovery to the first state using the setting parameter.

The radio network controller according to the present invention includes a communication device, a storage device, and a control device. The communication device performs a packet communication with a communication apparatus through a base transceiver station using an individual channel or a common channel in a wireless communication system as a physical channel, receives from the communication apparatus a transition request to change to a second state in which the packet communication is performed with the communication apparatus using the common channel in a first state in which the packet communication is performed with the communication apparatus using the individual channel, and receives from the communication apparatus a request to reset the individual channel in the second state. The storage device stores identification information about a communication line in the first state, and line information including a setting parameter of a communication line in the first state. The control device releases the individual channel with the line information about the communication line held and performs control for transition to a second state when it receives a transition request, and performs control of recovery to the first state using the setting parameter when it receives a reset request.

BRIEF DESCRIPTION OF THE DRAWINGS

FIG. 2A is a view (1) showing a RADIO LINK SETUP REQUEST;

FIG. 2B is a view (2) showing a RADIO LINK SETUP REQUEST;

FIG. 3A is a view (1) showing a TRANSPORT CHANNEL RECONFIGURATION;

FIG. 3B is a view (2) showing a TRANSPORT CHANNEL RECONFIGURATION;

FIG. 3C is a view (3) showing a TRANSPORT CHANNEL RECONFIGURATION;

FIG. 3D is a view (4) showing a TRANSPORT CHANNEL RECONFIGURATION;

FIG. 4A shows the principle of the communication apparatus according to the present invention;

FIG. 6 shows the line information about the radio network controller;

FIG. 7 shows the line information about the base transceiver station;

Figure 8:
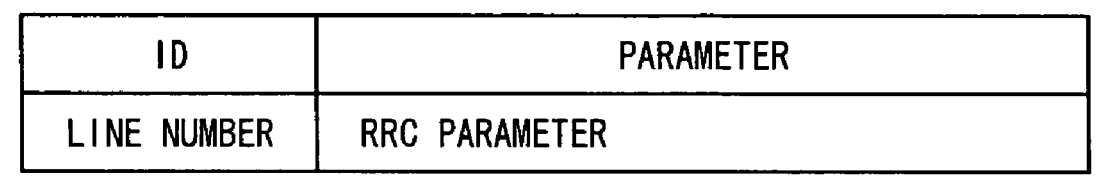

FIG. 8 shows the line information about the mobile station;

FIG. 9 shows the first RESUME REQUEST;

FIG. 10 shows the second RESUME REQUEST;

FIG. 11 is an operation flowchart (1) of the mobile communication system.

DETAILED DESCRIPTION OF THE PREFERRED EMBODIMENTS

Figure 1A:
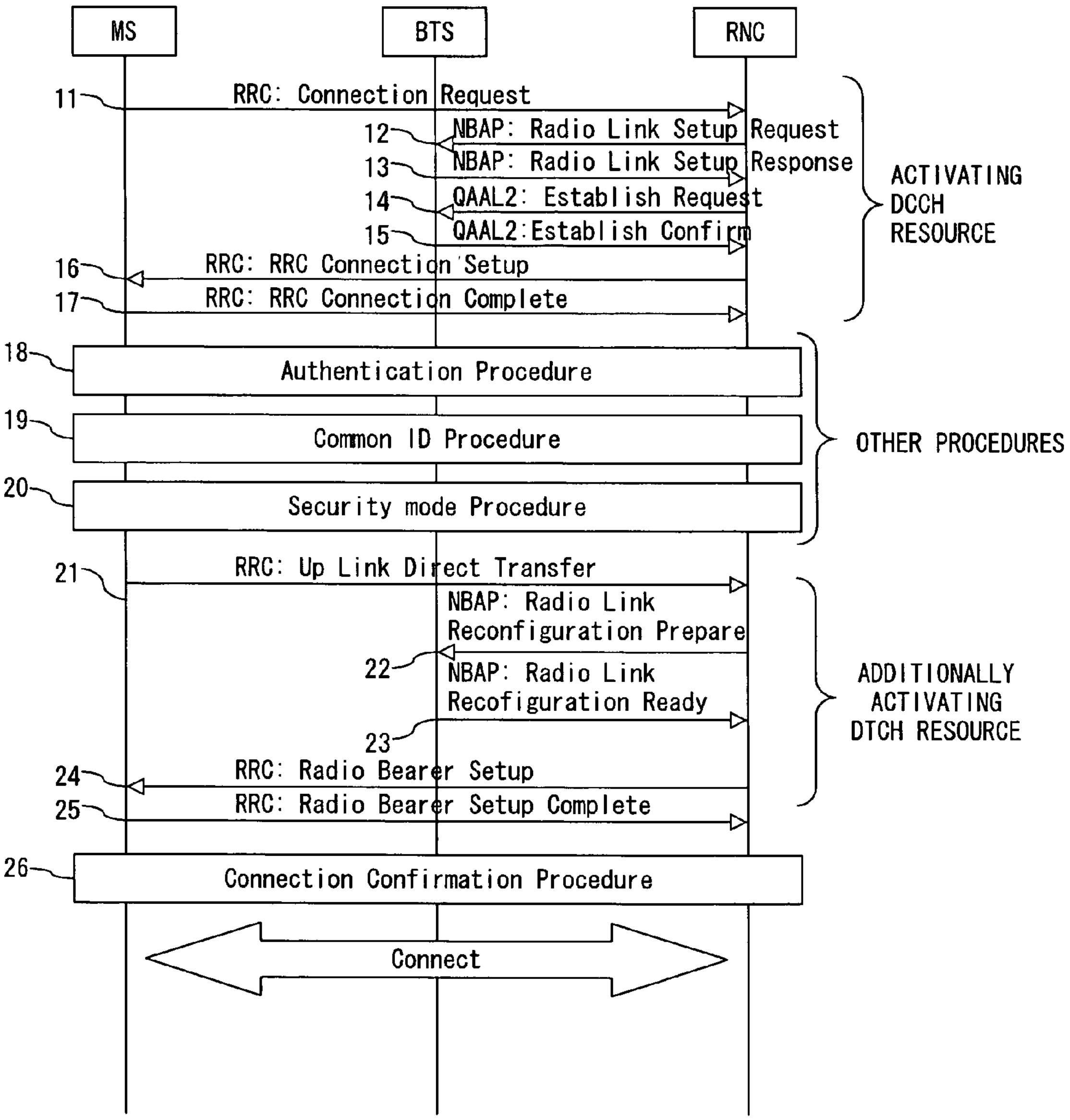
FIG. 1A shows the conventional calling sequence.

The best modes for embodying the present invention are described below by referring to the attached drawings.

FIG. 4A shows the principle of the communication apparatus according to the present invention. A communication apparatus 101 shown in FIG. 4A comprises a communication device 111, a storage device 112, and a control device 113.

The communication device 111 uses an individual channel or a common channel as a physical channel in the wireless communication system, and performs a packet communication with a radio network controller 103 through a base transceiver station 102. The storage device 112 stores the identification information about a communication line in the first state in which a packet communication with the radio network controller 103 is performed using an individual channel, and the line information including the setting parameter of the communication line in the first state.

The control device 113 compares the index of an amount of packet data communication in the first state with a predetermined threshold, releases the individual channel with the line information about the communication line held when the index falls below the threshold, and performs control of changing to the second state in which a packet communication with the radio network controller 103 is performed using a common channel. Then, it compares the index of an amount of packet data communication in the second state with the threshold, and performs control of recovery to the first state using the setting parameter when the index exceeds the threshold.

The line information about the communication line in the first state is also stored in the base transceiver station 102 and the radio network controller 103 in addition to the communication apparatus 101. When the index of the amount of packet data communication in the second state exceeds the threshold, the control of recovery to the first state is performed using the setting parameters stored in the respective devices.

Thus, in the present invention, a change from the communication status using an individual channel to the communication status using a common channel is performed with the line information about the communication line held in each network configuration device. Thus, although an individual channel is required again, control is returned to the original individual channel only by the radio network controller 103 notifying the communication apparatus 101 and the base transceiver station 102 of the minimal parameters.

The communication apparatus 101 corresponds to, for example, a mobile station described later and shown in FIG. 5C. The communication device 111 corresponds to an antenna 501, an RF unit 502, and a baseband unit 503. The storage device 112 corresponds to a storage unit 506. The control device 113 corresponds to a call processing control unit 505.

The first and second states respectively correspond to, for example, the Cell_DCH status and the Cell_FACH status.

According to the present invention, since the number of parameters in the message transmitted is reduced when control is returned from the common channel to the original individual channel, the parameter setting operation can be simplified. Additionally, since the time required in providing a notification can be reduced, the time required in re-connecting an individual channel can be shortened. Thus, a user can perform a transition of channels without a stress although an individual channel is re-connected during the communication of a packet, etc.

According to the present embodiment, each network configuration device of the MS, BTS, and RNC comprises a storage unit for storing the line information about the Cell_DCH status preceding the Cell_FACH status.

If a message of a measurement report event 4*a* is transmitted when the MS that has entered the Cell_FACH status recovers to the Cell_DCH, then the receiving RNC calls the line information about the Cell_DCH before the transition only by specifying a recovery parameter not by newly providing a line connecting parameter according to the NBAP signal and the RRC signal for setting a line.

Thus, the configuration of the NBAP/RRC message can be simplified. Furthermore, by reducing the parameter resetting time, the time required for the Cell_DCH recovery can be shortened.

Figure 4B:
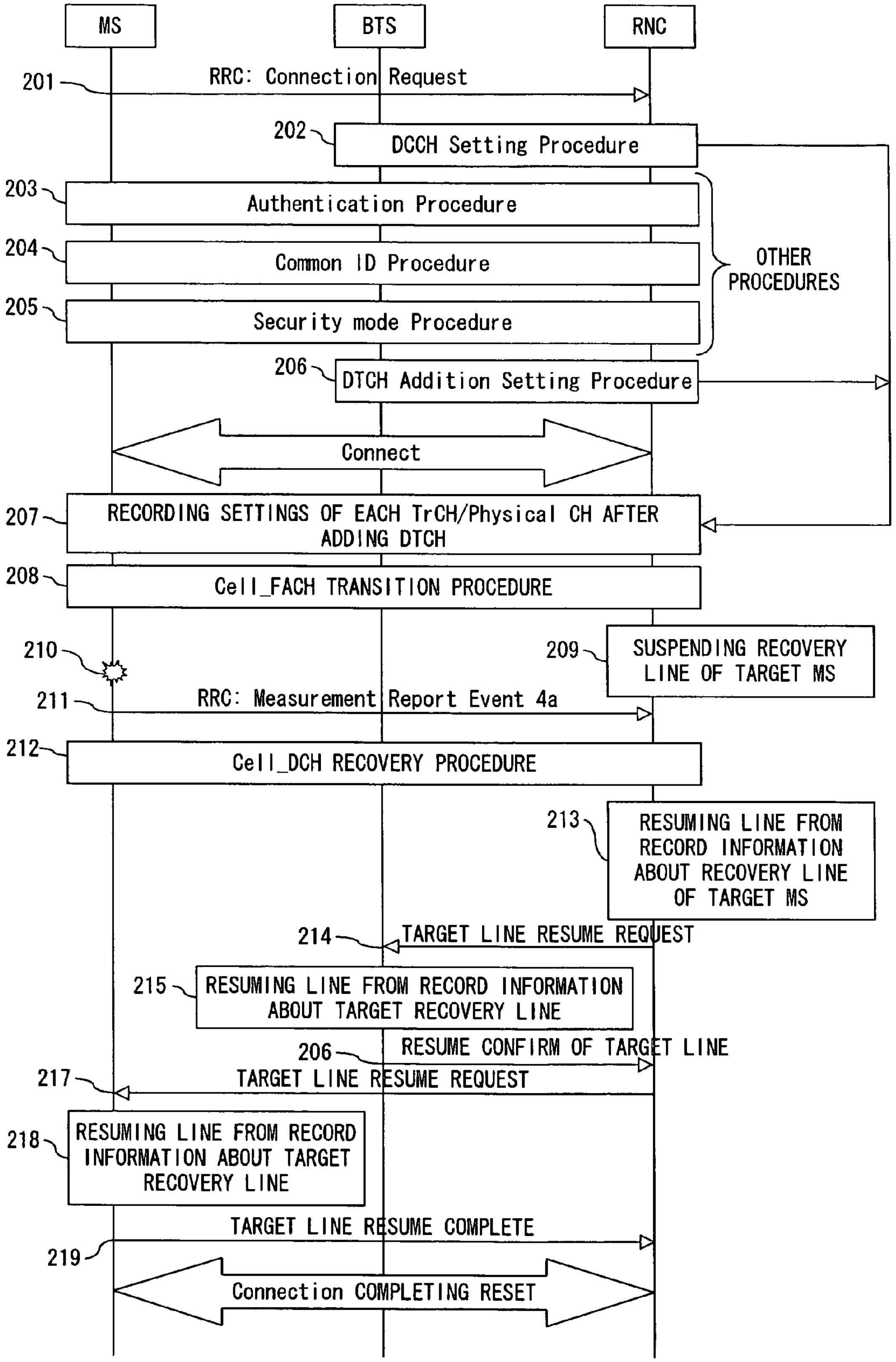
FIG. 4B shows the Cell_FACH transition/Cell_DCH recovery sequence according to the present invention.

FIG. 4B shows a transition from the Cell_DCH to the Cell_FACH in the UMTS system and the operation sequence for recovery from the Cell_FACH to the Cell_DCH.

When a call connection request 201 is transmitted from the MS to the RNC, each network configuration device performs DCCH activation and DTCH addition using a normal call setting algorithm. First, a DCCH setting procedure 202 corresponding to the messages 12 through 15 is performed. Next, procedures 203 through 205 corresponding to procedures 18 through 20 are performed. Then, a DTCH addition setting procedure 206 corresponding to messages 22 through 23 is performed. Thus, an individual channel comprising a DCCH and a DTCH is activated (connected), and the MS performs a packet communication using the individual channel.

After the completion of the activation of the individual channel (after a communication line is connected), each network configuration device performs a procedure 207 for temporarily holding the value of a setting parameter of the activated individual channel. At this time, each type of identification (ID) information (RL (radio link)-ID/DCH-ID) used for setting and a parameter value are stored in the storage unit as line information.

Figure 1B:
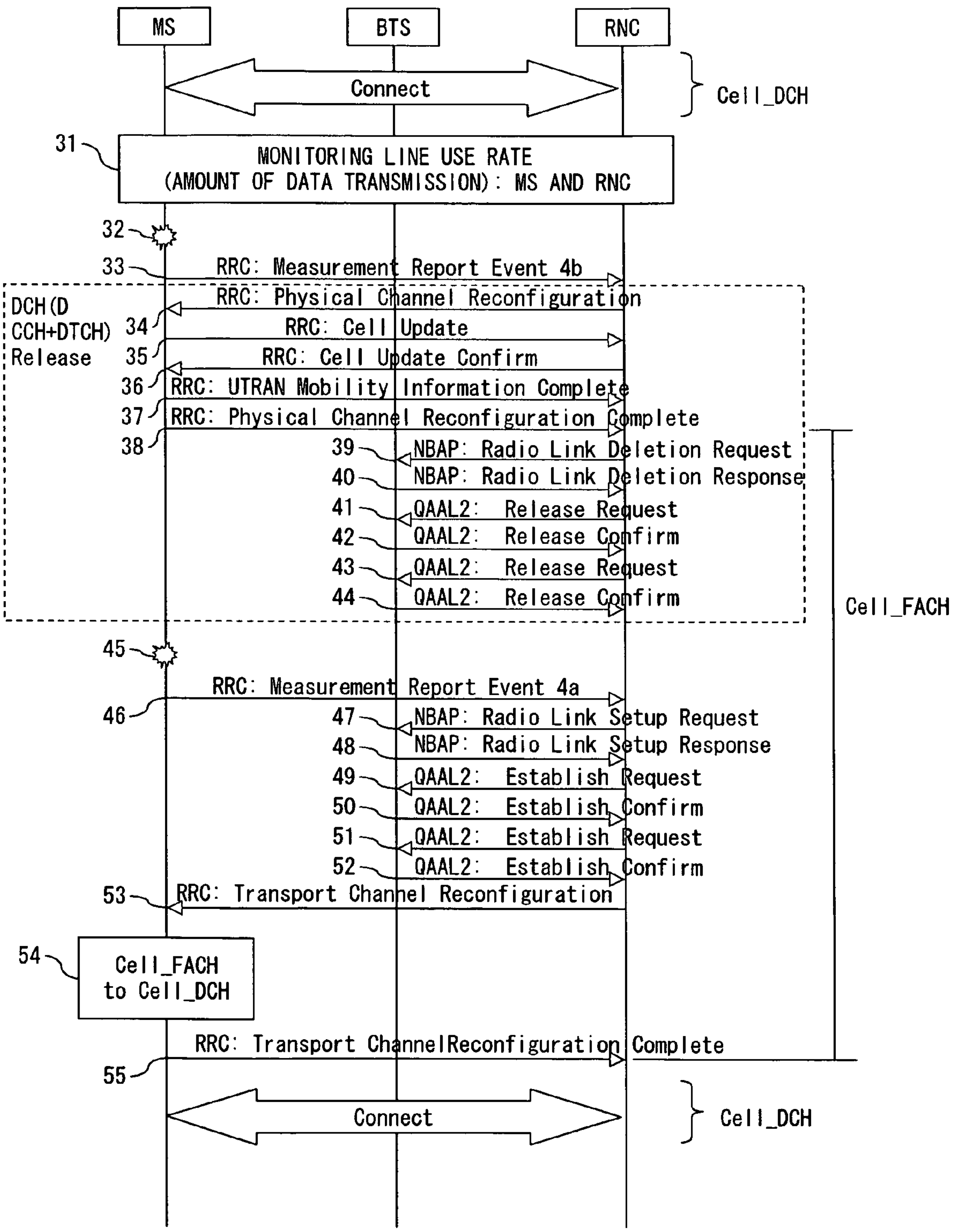
FIG. 1B shows a conventional Cell_FACH transition/Cell_DCH recovery sequence.

Next, when a traffic volume event occurs such as the line use rate (amount of data communication) falls below the threshold in the MS, a Cell_FACH transition procedure 208 corresponding to messages 34 through 44 shown in FIG. 1B is performed, and the communication status is changed from the Cell_DCH to the Cell_FACH. Thus, an individual channel as a physical resource is temporarily released.

At this time, the RNC performs a suspend operation 209 for temporarily stopping (suspending) the line being used by the target MS, and holds the line information about the preceding status without deleting from the storage unit. In this case, since the logical resource of the temporarily stopped line is held, another MS cannot use it except when the individual channel is released by a call disconnection.

Next, when an event such as a line use rate (amount of data communication) exceeding a threshold, etc. occurs in the MS during communication in the Cell_FACH, the MS transmits a message 211 of the measurement report event 4*a* to the RNC as the Cell_DCH recovery trigger. Thus, a Cell_DCH recovery procedure 212 is performed among the MS, BTS, and RNC.

Then, the RNC perform a resume operation 213 for calling the line information about the target MS held in the storage unit, and transmits a resume request (target line resume request) message 214 to the BTS according to the NBAP signal in the Iub line between the BTS and the RNC.

In response to the request, the BTS performs a resume operation 215 for calling the line information about a target line held in the storage unit, and transmits to the RNC a resume complete message 216 of the completion of the resumption using the NBAP signal (target line resume confirm).

Next, the RNC transmits to the MS a resume request message 217 of the target line according to the RRC signal in the Uu line between the MS and the RNC.

In response to the request, the MS performs a resume operation 218 for calling the line information about a target line held in the storage unit, and transmits to the RNC a resume complete message 219 of the completion of the resumption using the RRC signal (target line resume confirm).

Upon receipt of the resume complete message 219 from the MS, the RNC completes the recovery to the Cell_DCH, and an individual channel is connected again.

Thus, when the MS in the Cell_FACH state recovers from the Cell_DCH status, the line in the temporarily stopped preceding status is resumed. By using a parameter value held in the storage unit at the recovery from the Cell_FACH to the Cell_DCH, the time required by the network configuration device including the MS in setting/checking a parameter is shortened. Thus, since the time required to reset a channel at the recovery can be shortened, an application (transmitting/receiving data) can be smoothly switched (recovery of a channel without a stress).

In the present embodiment, to propel the significant use of logical channel resources as finite resources, it is allowed to clear the held line information in the following cases. Thus, the significant use of logical resources can be considered in addition to the advantage of shortening the time required to set a channel at the recovery from the Cell_FACH.

(1) When the MS in the Cell_FACH status is changed to another cell of the BTS (wireless zone) (cell update: cause cell reselection), the line information is cleared. The “Cell Update” is a message transmitted from the MS to the RNC to check the possibility of the RRC communication in the current cell. When the MS is moved to another cell, “Cell Reselection” is specified in the message.

(2) When a timeout occurs during the wait for Periodical Cell Update for the reason such as the transition of the MS in the Cell_FACH status to the area out of the wireless zone (dead space) (when it is determined that an Uu line has been disconnected on the MS side), etc., the line information is cleared. The “Periodical Cell Update” is a message periodically transmitted from the MS to the RNC for the same purpose as “Cell Update”. A timeout occurs when the RNC does not receive the message within a predetermined time.

(3) When the frequency of the “Periodical Cell Update” exceeds a predetermined threshold as a new parameter, it is determined that there is a low probability that the target MS returns to the Cell_DCH status, and the line information is cleared.

Thus, by providing the logic of releasing the temporarily stopped resources, a wasteful reserve of resources in the system can be avoided, and the significant use of finite resources can be realized. The resource releasing logic in (3) above is concretely explained below by referring to FIGS. 11 and 12.

FIG. 4B shows the sequence of issuing a call from the MS in the idle status. When the MS in the idle status is called from the network side, the communication status is changed in the similar sequence. In this case, the paging message is transmitted from the CN not shown in the attached drawings to the RNC, and then the RNC transmits the paging message to the MS. Upon receipt of the message, the called MS transmits the call connection request 201 to the RNC, and the subsequent sequence is executed.

Next, the configuration of the network configuration device shown in FIG. 4B and the data structure of the storage unit are explained below by referring to FIGS. 5A through 10.

Figure 5A:
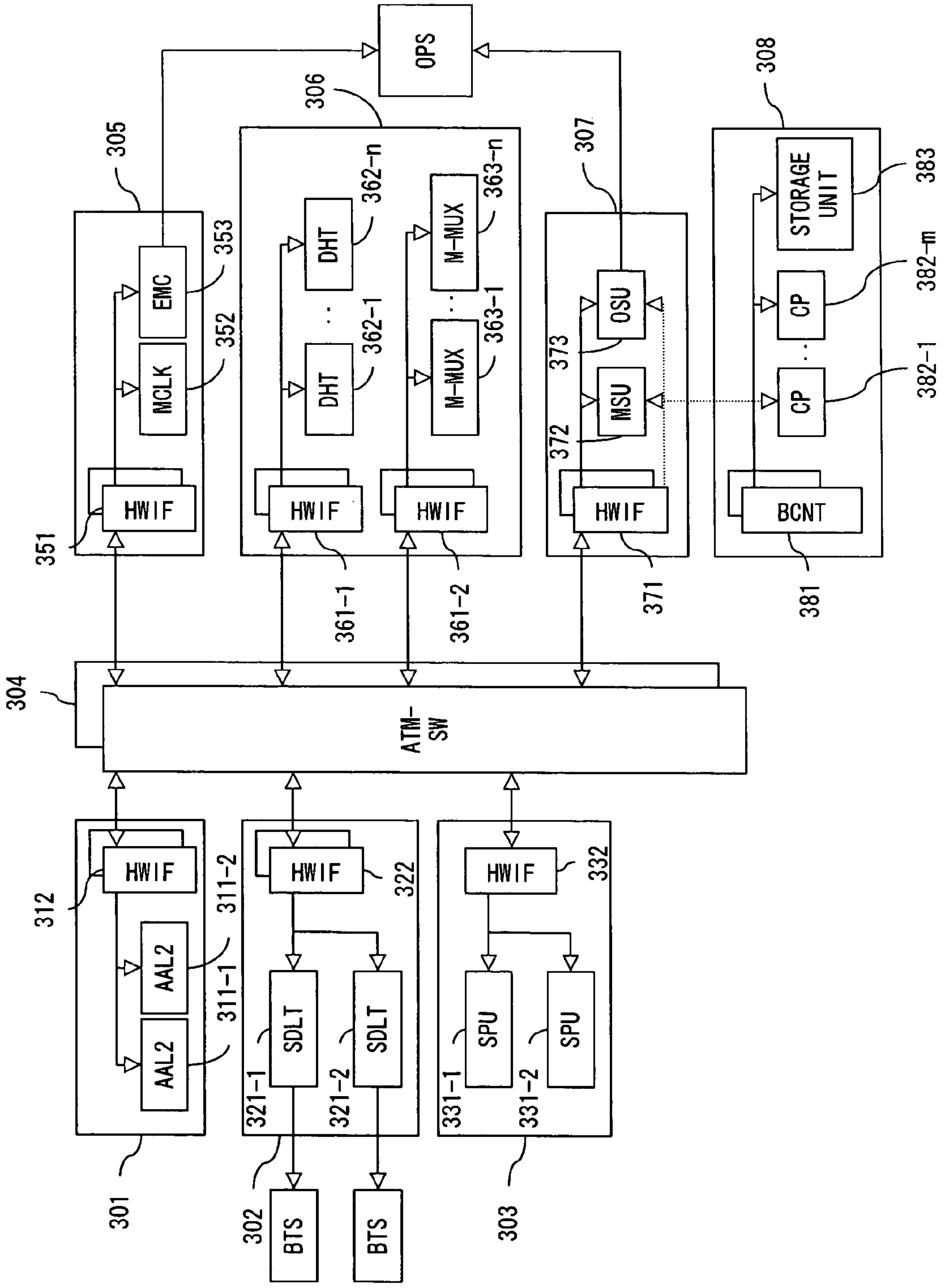
FIG. 5A shows the configuration of the radio network controller.

FIG. 5A shows an example of the configuration of the RNC. The RNC comprises processing units 301, 303, 306, an interface unit 302, a switch unit 304 (ATM-SW), control units 305 and 308, and a termination unit 307 and controls a plurality of BTSs.

The processing unit 301 comprises AAL2 (ATM adaptation layer 2) processing units 311-1 and 311-2, and a transmission line interface unit 312 (HWIF). The AAL2 processing units 311-1 and 311-2 performs a demultiplexing process of the AAL2.

The interface unit 302 includes transmission line interface units 321-1 (SDLT), 321-2 (SDLT), and 322 (HWIF). The transmission line interface units 321-1 and 321-2 terminate the Iub line between the BTS and the RNC.

The processing unit 303 comprises packet data processing units 331-1 (SPU) and 331-2 (SPU), and a transmission line interface unit 332 (HWIF). The packet data processing units 331-1 and 331-2 process packet data.

The switch unit 304 switches the ATM (asynchronous transfer mode). The control unit 305 comprises a transmission line interface unit 351 (HWIF), a wireless frame clock generation unit 352 (MCLK), and an emergency control unit 353 (EMC). The wireless frame clock generation unit 352 generates a intra-device reference clock signal, and the emergency control unit 353 performs abnormal monitor control of the device status.

The processing unit 306 comprises a transmission line interface unit 361-1 (HWIF) and 361-2 (HWIF), diversity handover trunk units 362-1 (DHT) through **362-*n* (DHT), and MAC (media access control) demultiplexing unit 363-1 (M-MUX) through 363-*n* (M-MUX). The diversity handover trunk units 362-1 through 362-*n* perform the diversity handover process, and the MAC demultiplexing units 363-1 through 363-*n*** perform the MAC layer demultiplexing process of a wireless line.

The termination unit 307 comprises a transmission line interface unit 371 (HWIF), a mobile station opposed signal termination unit 372 (MSU), and an OPS (operation system) opposed signal termination unit 373 (OSU), and terminates a control signal for call processing, etc.

The control unit 308 comprises a bus control unit 381 (BCONT), call processing control units 382-1 (CP) through **382-*m* (CP), and a storage unit 383. The call processing control units 382-1 through 382-*m*** perform call connection control, mobility management, etc.

A call processing control unit 382 stores the line information in the Cell_DCH in the storage unit 383 after the line connection with the MS, and the storage unit 383 holds the line information about a target line when the MS changes to the Cell_FACH. Thus, the target line is temporarily stopped. The line information about a connected call stored in the storage unit 383 is, for example, as shown in FIG. 6.

The line information comprises ID information and a parameter, and is registered in the storage unit 383 for each line in the system. The ID information comprises a line number (RL-ID/DCH-ID, etc.), a target MS, and the address information about the target BTS. Corresponding to the address information about the MS, an RRC parameter value for use in the Uu line with the MS is stored. Corresponding to the address information about the BTS, an NBAP parameter value for use in the Iub line with the BTS is stored. The parameter values can be omitted in the line information.

The call processing control unit 382 resumes a temporarily stopped line by reading the ID information including the address information about the MS and notifying the target MS and the target BTS of the information, when the same MS transmits a call connection request for the Cell_DCH again.

Figure 5B:
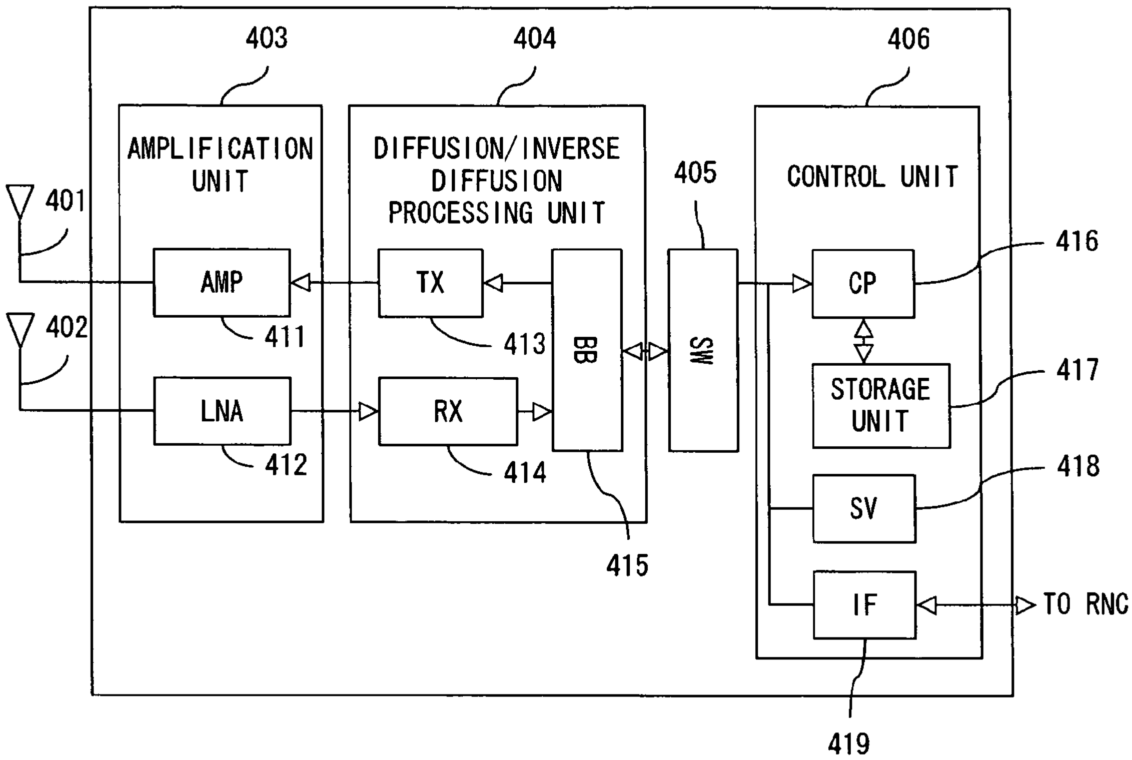
FIG. 5B shows the configuration of the base transceiver station.

FIG. 5B shows an example of the configuration of the BTS. The BTS comprises a transmission antenna 401, a reception antenna 402, an amplification unit 403, a diffusion/inverse diffusion processing unit 404, a switch unit 405 (SW), and a control unit 406.

The amplification unit 403 comprises a transmitting amplifier 411 (AMP) and a receiving low noise amplifier 412 (LNA). The diffusion/inverse diffusion processing unit 404 comprises a transmitter 413 (TX), a receiver 414 (RX), and a baseband unit 415 (BB).

The signal transmitted from the MS is received by the reception antenna 402, amplified by the receiving low noise amplifier 412, and transferred to the control unit 406 through the receiver 414, the baseband unit 415, and the switch unit 405. At this time, the receiver 414 detects a received signal and performs an analog-to-digital (A/D) conversion. The baseband unit 415 performs a baseband signal processing such as inverse diffusion, etc. of a received signal in the W-CDMA system.

A signal from the control unit 406 is transferred through the switch unit 405, the baseband unit 415, and the transmitter 413, and after amplified by the 411, transmitted to the MS from the transmission antenna 401. At this time, the baseband unit 415 performs baseband signal processing such as diffusion, etc. of a transmission signal in the W-CDMA system, and the transmitter 413 performs the digital-to-analog (D/A) conversion and a conversion to an RF signal.

The control unit 406 comprises a call processing control unit 416, a storage unit 417, a monitor control unit 418 (SV), and an interface 419 (IF). The call processing control unit 416 performs the management of a wireless channel, the management of a physical line (Iub line), the quality control, etc. The monitor control unit 418 monitors the device status, and the interface 419 terminates the Iub line between the BTS and RNC.

After the line is connected between the MS and the RNC, the call processing control unit 416 stores the line information about an activated individual channel in the storage unit 417, and the storage unit 417 holds the line information about a target line when the MS enters the Cell_FACH. Thus, the target line information is temporarily stopped.

In this case, the message 39 of "Radio Link Deletion Request" shown in FIG. 1A is transmitted from the RNC to the BTS. However, since the information about the line is to be recorded, the line information is not deleted. The line information about a connected call stored in the storage unit 417 is shown in, for example, FIG. 7.

The line information comprises ID information and a parameter, and is registered in the storage unit 417 for each line. An NBAP parameter value for use in the Iub line with the RNC is stored as associated with the line number (RL-ID/DCH-ID, etc.) as ID information.

When the same MS transmits again a call connection request for the Cell_DCH, and the resume request message 214 shown in FIG. 2 is received from the RNC, the call processing control unit 416 reads the parameter value corresponding to the ID information obtained by the resume request message 214 and transfers it to the interface 419, thereby resuming the temporarily stopped line. The interface 419 applies the transferred parameter value to the target line and performs communication with the RNC.

Figure 7:
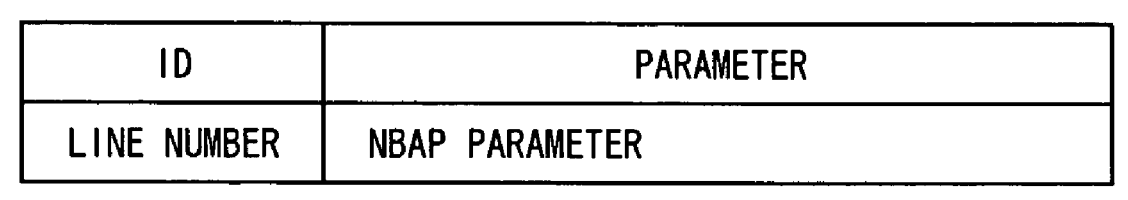

Relating to the parameter shown in FIG. 7, a parameter value for use by the diffusion/inverse diffusion processing unit 404 can be added. In this case, the call processing control unit 416 reads the parameter value corresponding to the notified ID information, transfers it to the diffusion/inverse diffusion processing unit 404, and the diffusion/inverse diffusion processing unit 404 performs signal processing using the transferred parameter value.

The storage unit storing the line information is also provided in the interface 419 and the diffusion/inverse diffusion processing unit 404 to store a necessary parameter value together with the ID information. In this case, the interface 419 and the diffusion/inverse diffusion processing unit 404 read the corresponding parameter value from the storage unit and use according to the ID information notified by the call processing control unit 416.

Figure 5C:
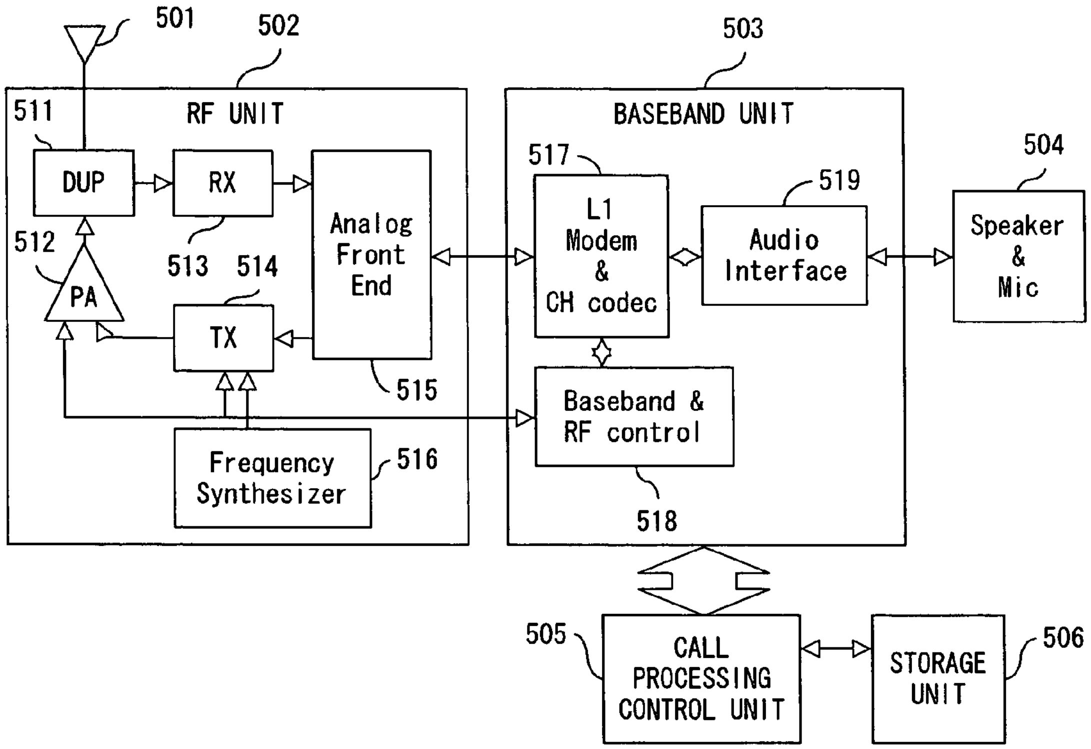
FIG. 5C configuration of a mobile station.

FIG. 5C shows an example of the configuration of the MS. The MS comprises the antenna 501, the RF (radio frequency) unit 502, the baseband unit 503, a voice input/output unit 504 (Speaker and Mic), the call processing control unit 505, and the storage unit 506.

The RF unit 502 includes an antenna duplexer 511 (DUP), a power amplifier 512 (PA), a receiver 513 (RX), a transmitter 514 (TX), a converter unit 515 (analog front end), and a frequency synthesizer 516.

The baseband unit 503 comprises a signal processing unit 517 (L1 modem & CH codec), a control unit 518 (baseband & RF control), and a voice interface 519 (audio interface). The voice input/output unit 504 comprises a speaker and a microphone.

The signal transmitted by the BTS is received by the antenna 501, and transferred to the baseband unit 503 through the antenna duplexer 511, the receiver 513, and the converter unit 515. At this time, the receiver 513 detects a received signal, the converter unit 515 performs an A/D conversion, and the baseband unit 503 performs baseband signal processing such as inverse diffusion, etc. of a received signal in the W-CDMA system. Then, a voice signal is output to the voice input/output unit 504 from the voice interface 519.

The voice signal from the voice input/output unit 504 is input to the voice interface 519, and transferred as a transmission signal through the baseband unit 503, the converter unit 515, and the transmitter 514. After the signal is amplified by the power amplifier 512, it is transmitted from the antenna 501 to the BTS through the antenna duplexer 511. At this time, the baseband unit 503 performs baseband signal processing such as the diffusion, etc. of a transmission signal in the W-CDMA system, the converter unit 515 performs a D/A conversion, and the transmitter 514 performs a conversion to an RF signal using the output of the frequency synthesizer 516.

The call processing control unit 505 performs the management of a wireless channel, the quality control, the mobility management, etc., monitors a line use rate (amount of data communication) to determine whether or not it exceeds a threshold. After the line is connected between the BTS and the RNC, the call processing control unit 505 stores the line information about an activated individual channel in the storage unit 506, and the storage unit 506 holds the line information about a target line information when the MS enters the Cell_FACH. Thus, the target line is temporarily stopped.

In this case, in the procedure 208 shown in FIG. 4B, the Cell Update procedure is performed, an individual channel is disconnected, and the MS enters the Cell_FACH. The line information about the connected call stored in the storage unit 506 is shown in, for example, FIG. 8.

The line information comprises ID information and a parameter, and is registered in the storage unit 506 for each line. An RRC parameter value for use in the Uu line with the RNC is stored as associated with the line number (RL-ID/DCH-ID, etc.) as ID information.

Afterwards, when the traffic status is changed, and the MS requires the transition to the Cell_DCH again, the MS transmits to the RNC the message 211 of the measurement report event 4*a* shown in FIG. 4B as a call connection request for the Cell_DCH, and receives the resume request message 217 from the RNC.

At this time, the call processing control unit 505 reads from the storage unit 506 the parameter value corresponding to the ID information received by the resume request message 217 and transfers it to the baseband unit 503, thereby resuming the temporarily stopped line. The baseband unit 503 applies the transferred parameter value to the target line and performs the baseband signal processing.

As described above, (1) when the MS moves to another cell, (2) when a timeout occurs during the wait for "Periodical Cell Update", and (3) when the frequency of "Periodical Cell Update" exceeds a threshold, the line information about a target line is cleared from the storage unit 506.

FIG. 9 shows an example of the resume request message 214 from the RNC to the BTS shown in FIG. 4B. According to Resume line ID information 901 included in the message, the line number required in resuming the temporarily stopped line is transmitted to the BTS.

The message aims at transmitting a notification of the Resume line ID information 901. In addition to this, it is necessary at least to provide a notification of a parameter newly required at the recovery from the Cell_FACH to the Cell_DCH (fluctuating parameter). In this example, the fluctuating parameter can be a parameter 902 indicating the initial transmission power.

FIG. 10 shows an example of the resume request message 217 from the RNC to the MS shown in FIG. 4B. According to Resume line ID information 1001 included in the message, the MS is notified of the line number required in resuming the temporarily stopped line.

Figure 12:
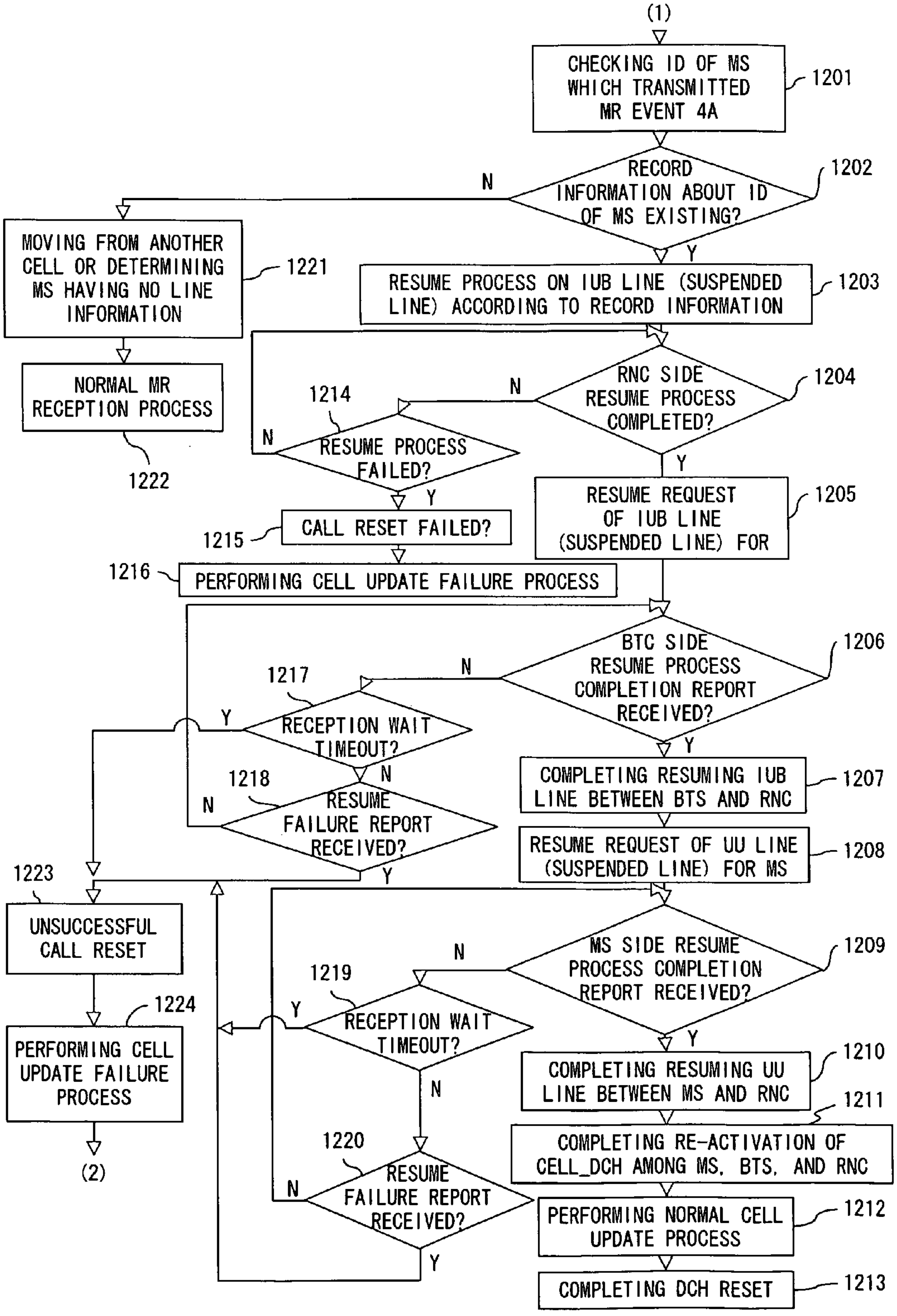
FIG. 12 is an operation flowchart (2) of the mobile communication system.

FIGS. 11 and 12 are operation flowcharts of the UMTS system shown in FIG. 4B. First, the MS transmits the call connection request 201 to the RNC (step 1101). When the request is received from the network, the call connection request 201 is transmitted to the RNC after the RNC calls the request by a paging message.

The RNC checks whether or not the activation of the DCCH and the DTCH has been completed and a call has been connected (step 1102). When the call is connected, then the activated DTCH checks whether or not the call corresponds to a packet call (step 1103). When the call is not a packet call, normal call managing is performed (step 1113).

If the DTCH is a packet call, the RNC stores the setting information (parameter value) about the DCCH and the DTCH, the addresses of the MS and the BTS, and the line information comprising a line number in the storage unit 383 (step 1104). Then, it instructs the BTS and the MS to record the line information. In response to the instruction, the BTS and the MS stores the line information in the storage unit 417 and the storage unit 506.

Next, the MS checks whether or not a Cell_FACH transition event has occurred (step 1105). If the Cell_FACH transition event has not occurred, the MS determines whether or not the call of the Cell_DCH is to continue (step 1114). If the call is to continue, then the check in step 1105 is repeated.

If the call is disconnected, each network configuration device of the MS, the BTS, and the RNC checks whether or not the call disconnecting process has been completed (step 1117). Unless the call disconnecting process is completed, the process abnormally terminates (step 1118).

If the call disconnecting process has been completed, the MS, BTS, and the RNC clears the line information corresponding to a target call from the storage units 506, 417, and 383, and a temporarily stopped line is released (step 1119).

In step 1105, when a Cell_FACH transition event occurs, the MS transmits to the RNC a message of the measurement report event 4*b* as a call connection request of the Cell_FACH.

Upon receipt of the message, the RNC checks whether or not the transition to the Cell_FACH has been completed (step 1106). If the transition has not been completed, it is then checked whether or not the transition has failed (step 1115). If the transition has not failed, the check in step 1106 is repeated. If the transition has failed, the process in step 1119 is performed at an instruction from the RNC.

If the transition to the Cell_FACH is completed in step 1106, the RNC communicates with the MS in the Cell_FACH (step 1107).

Next, the MS checks whether or not a Cell Update event has occurred (step 1108). If the Cell Update event has occurred, a Cell Update message is transmitted to the RNC.

Upon receipt of the message, the RNC checks whether or not the received message corresponds to a Periodical Cell Update event (step 1109). If it is a Periodical Cell Update event, then it is checked whether or not a Periodical Cell Update process has been completed (step 1110).

If the Periodical Cell Update process has not been completed, then it is checked whether or not the process has failed (step 1116). If it has not failed, the check in step 1110 is repeated. If the Periodical Cell Update process has failed, the process in step 1119 is performed at an instruction from the RNC.

In step 1110, when the Periodical Cell Update process is completed, then the frequency of Periodical Cell Update is compared with a threshold (step 1111). If the frequency exceeds the threshold, the process in step 1119 is performed at an instruction from the RNC.

If the frequency of Periodical Cell Update falls below the threshold, then the RNC checks whether or not the message 211 of the measurement report event 4*a* has been received from the MS (step 1112). Unless the message 211 has been received, the check in step 1110 is repeated.

Upon receipt of the message 211, the RNC retrieves the address of the source MS included in the message 211 (step 1201), and checks whether or not the line information corresponding to the MS address is in the storage unit 383 (step 1202). If there is no corresponding line information, it is determined that the source MS has moved from another cell or has no line information about a temporarily stop (step 1221). Then, a normal Measurement Report reception process is performed, and an individual channel is activated (step 1222).

If there is corresponding line information in the storage unit 383 in step 1202, the resuming process on the temporarily stopped Iub line according to the line information (step 1203), and it is checked whether or not the resuming process has been completed (step 1204). If the resuming process has not been completed, it is checked whether or not the resuming process has failed (step 1214). If it has not failed, the check in step 1204 is repeated.

If the resuming process has failed, it is determined that the call has been unsuccessfully reset (step 1215), and the Cell Update Failure process is performed (step 1216).

If the resuming process has been completed in step 1204, the resume request message 214 including the ID information about the line information corresponding to the address of the source MS is transmitted to the BTS to request to resume the Iub line (step 1205).

Next, it is checked whether or not the resume complete message 216 has been received from the BTS (step 1206). Unless the resume complete message 216 has been received, it is checked whether or not a predetermined reception waiting time has passed (step 1217). If the waiting time has passed, the RNC and the MS determine that the call has been unsuccessfully reset (step 1223), and the Cell Update Failure process is performed (step 1224). Then, the process in step 1119 is performed.

Unless the waiting time has passed in step 1217, the RNC checks whether or not the unsuccessful resume message has been received from the BTS (step 1218). If the unsuccessful resume message has not been received, the check in step 1206 is repeated. When the RNC receives the unsuccessful resume message, the processes in and after step 1223 are performed.

If the RNC receives the resume complete message 216 in step 1206, the RNC and the BTS completes the resuming process on the Iub line between the BTS and RNC (step 1207).

Then, the RNC transmits to the source MS the resume request message 217 including the ID information about the line information corresponding to the address of the source MS to request to resume the Uu line (step 1208). Then, it is checked whether or not the resume complete message 219 has been received from the MS (step 1209). Unless the resume complete message 219 has been received, it is checked whether or not a predetermined reception waiting time has passed (step 1219). If the waiting time has passed, the processes in and after step 1223 are performed.

If the waiting time has not passed in step 1219, the RNC checks whether or not the unsuccessful resume message has been received (step 1220). If the unsuccessful resume message has not been received, the check in step 1209 is repeated. When the RNC receives the unsuccessful resume message, the processes in and after step 1223 are performed.

If the RNC receives the resume complete message 219 in step 1209, the RNC and the MS complete the resuming process on the Uu line between the MS and the RNC (step 1210). Then, each network configuration device completes the activation of the individual channel of the Cell_DCH (step 1211) and the MS and the RNC perform the normal Cell Update procedure (step 1212). Thus, resetting the call terminates (step 1213).

FIGS. 11 and 12 show the process (step 1119) of clearing the line information when the frequency of Periodical Cell Update exceeds a threshold (step 1111). However, the process of clearing the line information when the MS moves to another cell and when a timeout occurs during the wait for Periodical Cell Update is omitted.

The RNC temporarily disconnects a line when the MS moves to another cell, which triggers the process similar to that in step 1119. Furthermore, the RNC counts the time interval of the Periodical Cell Update message received from the MS, and unless the next Periodical Cell Update message is received within a predetermined time, the process similar to that in step 1119 is performed.

Although the MS as a mobile terminal is used as an example of a UE (user equipment) in the UMTS system shown in FIG. 4B, it is considered that a similar status transition can be performed depending on the line use rate (amount of data communication) generally when a UE as a fixed terminal is used. Therefore, the individual channel resetting method according to the present invention is also applied to a fixed terminal.

Furthermore, the index for use in determining whether or not a transition to the Cell_FACH is performed and whether or not recovery to the Cell_DCH is performed is not limited to a line use rate, but another index of the amount of data communication of the UE such as an amount of data transmission, an amount of data reception, etc. can be used.

What is claimed is:

1. A communication apparatus, comprising:

a communication device performing a packet communication with a radio network controller through a base transceiver station using an individual channel or a common channel in a wireless communication system as a physical channel;

a storage device storing identification information about a communication line in a first state in which a packet communication is performed with the radio network controller using the individual channel, and line information, including a setting parameter of the communication line in the first state; and a control device releasing the individual channel with line information about the communication line held when an index of an amount of packet data communication in the first state is compared with a predetermined threshold and the index falls below the threshold, performing control of changing to a second state in which a packet communication is performed with the radio network controller using the common channel, and performing control of recovery to the first state using the setting parameter when an index of an amount of packet data communication in the second state is compared with the threshold, and when the index exceeds the threshold wherein the communication device transmits a reset request for the individual channel to the radio network controller when the index of the amount of packet data communication in the second state exceeds the threshold and receives a resume request from the radio network controller, and the control device performs control for recovery to the first state using a setting parameter corresponding to identification information about the communication line included in the resume request.

2. A radio network controller, comprising:

a communication device performing a packet communication with a communication apparatus through a base transceiver station using an individual channel or a common channel in a wireless communication system as a physical channel, receiving from the communication apparatus a transition request to change to a second state in which a packet communication is performed with the communication apparatus using the common channel in a first state in which the packet communication is performed with the communication apparatus using the individual channel, and receiving from the communication apparatus a request to reset the individual channel in the second state;

a storage device storing identification information about a communication line in the first state, and line information including a setting parameter of the communication line in the first state; and a control device releasing the individual channel with line information about the communication line held, and performing control of changing to the second state when the device receives a transition request, and performing control of recovery to the first state using the setting parameter when the device receives the reset request wherein line information stored in the storage device further comprises address information about the communication apparatus, the control device reads identification information about the communication line from line information corresponding to address information about a source of the transition request, and the communication device transmits a resume request including identification information about the read communication line to the communication apparatus.

3. The controller according to claim 2, wherein the communication device receives the transition request from the communication apparatus when the index of the amount of packet data communication in the first state falls below the threshold, and extracts the reset request from the communication apparatus when the index of the amount of packet data communication in the second state exceeds the threshold.

4. The controller according to claim 2 wherein line information stored in the storage device further comprises address information about the base transceiver station, the control device reads address information about the base transceiver station from line information corresponding to address information about a source of the transition request, and the communication device transmits a resume request including identification information about the communication line to the base transceiver station.

5. The controller according to claim 2, wherein the control device clears line information about the communication line from the storage device when the communication apparatus moves to a wireless zone of another base transceiver station in the second state.

6. The controller according to claim 2, wherein the control device clears line information about the communication line from the storage device when the device does not receive within a predetermined time a message to be periodically transmitted by the communication apparatus to check whether or not communications can be performed in the second state.

7. The controller according to claim 2, wherein the control device clears line information about the communication line from the storage device when a frequency of receiving a message to be periodically transmitted by the communication apparatus to check whether or not communications can be performed in the second state exceeds a predetermined threshold.

8. A physical channel resetting method for use in a wireless communication system in which a communication apparatus performs a packet communication with a radio network controller through a base transceiver station using an individual channel or a common channel as a physical channel, comprising:

storing, in each of the communication apparatus, the base transceiver station, and the radio network controller, line information including identification information about a communication line in a first state in which the communication apparatus and the radio network controller perform a packet communication using the individual channel, and a setting parameter of the communication line in the first state;

comparing an index of an amount of packet data communication in the first state with a predetermined threshold;

releasing the individual channel with line information about the communication line held when the index falls below the threshold, and performing control for a transition to a second state in which the communication apparatus and the radio network controller performs a packet communication using the common channel;

comparing an index of an amount of packet data communication in the second state with the threshold; and performing control for recovery to the first state using the setting parameter when the index exceeds the threshold wherein line information stored in the radio network controller further includes address information about the communication apparatus, identification information about the communication line is read from line information stored in the radio network controller and corresponding to address information about a source of the transition request, and a resume request including the read identification information about the communication line is transmitted from the radio network controller to the communication apparatus.

9. The method according to claim 8, wherein a transition request for a transition to the second state is transmitted from the communication apparatus to the radio network controller when the index falls below the threshold in the first state;

releasing the individual channel with line information about the communication line held, and performing control for a transition to the second state when the radio network controller receives the transition request;

transmitting a reset request for the individual channel from the communication apparatus to the radio network controller when the index falls below the threshold in the second state; and performing control for recovery to the first state using the setting parameter when the radio network controller receives the reset request.

10. The method according to claim 8, wherein line information stored in the radio network controller further includes address information about the base transceiver station, address information about the base transceiver station is read from line information stored in the radio network controller and corresponding to address information about a source of the transition request, and a resume request including identification information about the communication line is transmitted from the radio network controller to the base transceiver station.

11. The method according to claim 8, wherein line information about the communication line is cleared from each of the communication apparatus, the base transceiver station, and the radio network controller when the communication apparatus moves to a wireless zone of another base transceiver station in the second state.

12. The method according to claim 8, wherein line information about the communication line is cleared from each of the communication apparatus, the base transceiver station, and the radio network controller when the radio network controller does not receive within a predetermined time a message to be periodically transmitted by the communication apparatus to check whether or not communications can be performed in the second state.

13. The method according to claim 8, wherein line information about the communication line is cleared from each of the communication apparatus, the base transceiver station, and the radio network controller when a frequency of transmitting a message to be periodically transmitted by the communication apparatus to check whether or not communications can be performed in the second state exceeds a predetermined threshold.

* * * * *